United States Patent
Wang

(10) Patent No.: US 9,971,036 B2
(45) Date of Patent: May 15, 2018

(54) ASSISTED POSITIONING METHOD AND APPARATUS

(71) Applicant: Huawei Device Co., Ltd., Shenzhen (CN)

(72) Inventor: Yeqi Wang, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 342 days.

(21) Appl. No.: 14/578,860

(22) Filed: Dec. 22, 2014

(65) Prior Publication Data

US 2015/0160349 A1    Jun. 11, 2015

Related U.S. Application Data

(63) Continuation of application No. PCT/CN2014/084490, filed on Aug. 15, 2014.

(30) Foreign Application Priority Data

Dec. 5, 2013 (CN) .......................... 2013 1 0653206

(51) Int. Cl.
*G01S 19/05* (2010.01)
*G01S 19/25* (2010.01)
(Continued)

(52) U.S. Cl.
CPC .............. *G01S 19/05* (2013.01); *G01S 19/25* (2013.01); *G01S 19/34* (2013.01); *H04W 76/02* (2013.01)

(58) Field of Classification Search
CPC .......... G01S 19/05; G01S 19/25; G01S 19/34; H04W 76/02
(Continued)

(56) References Cited

U.S. PATENT DOCUMENTS 7,432,923 B2 * 10/2008 Fujiwara ................. G01S 19/48
                                                      342/357.31
8,150,415 B2 *  4/2012 Kim ....................... G01S 5/0036
                                                      455/414.2
(Continued)

FOREIGN PATENT DOCUMENTS

CN        102256349 A      11/2011
CN        103101509 A       5/2013
(Continued)

OTHER PUBLICATIONS

Partial English Translation and Abstract of Japanese Patent Application No. JPA2008541027, Apr. 6, 2016, 26 pages.
(Continued)

*Primary Examiner* — Chuong P Nguyen
(74) *Attorney, Agent, or Firm* — Conley Rose, P.C.

(57) ABSTRACT

An assisted positioning method and apparatus are provided. A user equipment runs the WINDOWS 8 system, the user equipment is connected to a global positioning system (GPS) device having an assisted global positioning system (A-GPS) function, and the assisted positioning method includes detecting, by the user equipment, that the GPS device enables a GPS function; sending, by the user equipment, an A-GPS indication message to the GPS device, where the A-GPS indication message is used to instruct the GPS device to enable the A-GPS function; receiving, by the user equipment, positioning information from the GPS device, where the positioning information is obtained by the GPS device by using the GPS function and the A-GPS function.

18 Claims, 5 Drawing Sheets

(51) Int. Cl.
*H04W 76/02* (2009.01)
*G01S 19/34* (2010.01)

(58) Field of Classification Search
USPC .................................................... 342/357.42
See application file for complete search history.

(56) References Cited

U.S. PATENT DOCUMENTS

| | | | |
|---|---|---|---|
| 8,626,199 B2* | 1/2014 | You | G01S 19/05 340/539.13 |
| 2005/0043038 A1* | 2/2005 | Maanoja | G01S 5/0027 455/456.1 |
| 2005/0070306 A1* | 3/2005 | Kim | H04W 64/00 455/456.2 |
| 2007/0109186 A1 | 5/2007 | Fujiwara et al. | |
| 2008/0062913 A1* | 3/2008 | Zander | G01S 5/0027 370/320 |
| 2009/0085801 A1 | 4/2009 | Sengupta et al. | |
| 2009/0146872 A1 | 6/2009 | Harper et al. | |
| 2010/0007553 A1* | 1/2010 | Kim | G01S 5/0063 342/357.22 |
| 2012/0100874 A1* | 4/2012 | You | G01S 19/05 455/456.1 |
| 2014/0010221 A1* | 1/2014 | Panian | H04W 76/02 370/338 |
| 2014/0099976 A1 | 4/2014 | Torbjorn et al. | |
| 2015/0156698 A1* | 6/2015 | Hsu | H04W 8/22 455/436 |

FOREIGN PATENT DOCUMENTS

| | | |
|---|---|---|
| EP | 1720030 A1 | 11/2006 |
| JP | H11083976 A | 3/1999 |
| JP | 2008541027 A | 11/2008 |
| JP | 2011511531 A | 4/2011 |
| WO | 2006006530 A1 | 1/2006 |
| WO | 2006117198 A1 | 11/2006 |

OTHER PUBLICATIONS

Partial English Translation and Abstract of Japanese Patent Application No. JPA2011511531, Apr. 6, 2016, 47 pages.
Foreign Communication From a Counterpart Application, Japanese Application No. 2015-551123, Japanese Office Action dated Jan. 26, 2016, 3 pages.
Foreign Communication From a Counterpart Application, Japanese Application No. 2015-551123, English Translation of Japanese Office Action dated Jan. 26, 2016, 3 pages.
Partial English Translation and Abstract of Japanese Patent Application No. JPH11-083976, Oct. 26, 2016, 34 pages.
Foreign Communication From a Counterpart Application, Japanese Application No. 2015-551123, Japanese Office Action dated Sep. 6, 2016, 7 pages.
Foreign Communication From a Counterpart Application, Japanese Application No. 2015-551123, English Translation of Japanese Office Action dated Sep. 6, 2016, 8 pages.
Partial English Translation and Abstract of Chinese Patent Application No. CN102256349A, Dec. 30, 2014, 3 pages.
Foreign Communication From a Counterpart Application, PCT Application No. PCT/CN2014/084490, International Search Report dated Nov. 18, 2014, 7 pages.
Foreign Communication From a Counterpart Application, PCT Application No. PCT/CN2014/084490, Written Opinion dated Nov. 18, 2014, 4 pages.
Foreign Communication From a Counterpart Application, European Application No. 14803032.3, Extended European Search Report dated Sep. 28, 2015, 7 pages.

* cited by examiner

ASSISTED POSITIONING METHOD AND APPARATUS

CROSS-REFERENCE TO RELATED APPLICATIONS

This application is a continuation of International Application No. PCT/CN2014/084490, filed on Aug. 15, 2014, which claims priority to Chinese Patent Application No. 201310653206.X, filed on Dec. 5, 2013, both of which are hereby incorporated by reference in their entireties.

TECHNICAL FIELD

The present invention relates to the field of positioning technologies, and in particular, to an assisted positioning method and apparatus.

BACKGROUND

Currently, an assisted global positioning system (A-GPS) has been widely used. However, with application of the WINDOWS 8 system in a user equipment, application of the A-GPS is limited to some extent.

A user equipment can instruct a global positioning system (GPS) device to enable an A-GPS function in the WINDOWS 8 system only after a user manually selects to enable the A-GPS function. Otherwise, the GPS device can only enable a GPS function, and cannot enable the A-GPS function, thereby lowering positioning accuracy.

SUMMARY

In view of this, the present invention provides an assisted positioning method and apparatus, so that a GPS device can simultaneously use a GPS function and an A-GPS function when enabling the GPS function, thereby improving positioning accuracy.

According to a first aspect, an embodiment of the present invention provides an assisted positioning method, where a user equipment runs the WINDOWS 8 system, the user equipment is connected to a GPS device having an A-GPS function, and the method includes detecting, by the user equipment, that the GPS device enables a GPS function; sending, by the user equipment, an A-GPS indication message to the GPS device, where the A-GPS indication message is used to instruct the GPS device to enable the A-GPS function; and receiving, by the user equipment, positioning information from the GPS device, where the positioning information is obtained by the GPS device by using the GPS function and the A-GPS function.

In a first possible implementation manner of the first aspect, the method further includes, after the sending, by the user equipment, an A-GPS indication message to the GPS device, dialing up, by the user equipment, according to a notification of the GPS device, to establish a network connection, where the network connection is used by the GPS device to implement the A-GPS function.

With reference to the first aspect or the first possible implementation manner of the first aspect, in a second possible implementation manner, the method further includes sending, by the user equipment, A-GPS configuration parameter information to the GPS device, where the A-GPS configuration parameter information is used by the GPS device to implement the A-GPS function.

According to a second aspect, an embodiment of the present invention provides an assisted positioning method, where a GPS device has an assisted global positioning system A-GPS function, the GPS device is connected to a user equipment running the WINDOWS 8 system, and the method includes enabling, by the GPS device, a GPS function; acquiring, by the GPS device, an A-GPS indication message from the user equipment; enabling, by the GPS device, the A-GPS function according to the A-GPS indication message; acquiring, by the GPS device, positioning information by using the GPS function and the A-GPS function; and sending, by the GPS device, the positioning information to the user equipment.

In a first possible implementation manner of the second aspect, before the enabling, by the GPS device, the A-GPS function, the method further includes determining, by the GPS device, a current network connection state, and if the GPS device is not connected to a network, dialing up, by the GPS device, to establish a network connection, where the network connection is used by the GPS device to implement the A-GPS function.

In a second possible implementation manner of the second aspect, before the enabling, by the GPS device, the A-GPS function, the method further includes determining, by the GPS device, a current network connection state, and if the GPS device is not connected to a network, instructing, by the GPS device, the user equipment to dial up, to establish a network connection, where the network connection is used by the GPS device to implement the A-GPS function.

With reference to the second aspect, the first possible implementation manner of the second aspect, or the second possible implementation manner of the second aspect, in a third possible implementation manner, the method further includes receiving A-GPS configuration parameter information sent by the user equipment, where the A-GPS configuration parameter information is used by the GPS device to implement the A-GPS function.

According to a third aspect, an embodiment of the present invention provides a user equipment, where the user equipment runs the WINDOWS 8 system, the user equipment is connected to a GPS device having an A-GPS function, and the user equipment includes a detection unit configured to detect that the GPS device enables a GPS function; a sending unit configured to send an A-GPS indication message to the GPS device, where the A-GPS indication message is used to instruct the GPS device to enable the A-GPS function; and a receiving unit configured to receive positioning information from the GPS device, where the positioning information is obtained by the GPS device by using the GPS function and the A-GPS function.

In a first possible implementation manner of the third aspect, the user equipment further includes an establishment unit configured to, after the user equipment sends the A-GPS indication message to the GPS device, dial up according to a notification of the GPS device, to establish a network connection, where the network connection is used by the GPS device to implement the A-GPS function.

With reference to the third aspect or the first possible implementation manner of the third aspect, in a second possible implementation manner, the sending unit is further configured to send A-GPS configuration parameter information to the GPS device, where the A-GPS configuration parameter information is used by the GPS device to implement the A-GPS function.

According to a fourth aspect, an embodiment of the present invention provides a GPS device, where the GPS device has an A-GPS function, the GPS device is connected to a user equipment running the WINDOWS 8 system, and the GPS device includes a first enabling unit configured to enable a GPS function; a first acquiring unit configured to acquire an A-GPS indication message from the user equipment; a second enabling unit configured to enable the A-GPS function according to the A-GPS indication message; a second acquiring unit configured to acquire positioning information by using the GPS function and the A-GPS function; and a sending unit configured to send the positioning information to the user equipment.

In a first possible implementation manner of the fourth aspect, the GPS device further includes an establishment unit configured to, before the A-GPS function is enabled, determine a current network connection state, and if the GPS device is not connected to a network, dial up to establish a network connection, where the network connection is used by the GPS device to implement the A-GPS function.

In a second possible implementation manner of the fourth aspect, the GPS device further includes an instructing unit configured to, before the GPS device enables the A-GPS function, determine a current network connection state, and if the GPS device is not connected to a network, instruct the user equipment to dial up, to establish a network connection, where the network connection is used by the GPS device to implement the A-GPS function.

With reference to the fourth aspect, the first possible implementation manner of the fourth aspect, or the second possible implementation manner of the fourth aspect, in a third possible implementation manner, the GPS device further includes a receiving unit configured to receive A-GPS configuration parameter information sent by the user equipment, where the A-GPS configuration parameter information is used by the GPS device to implement the A-GPS function.

According to the foregoing solutions, when a GPS device enables a GPS function, a user equipment running the WINDOWS 8 system actively sends an A-GPS indication message to the GPS device, so that the GPS device simultaneously uses the GPS function and an A-GPS function, thereby improving positioning accuracy.

DETAILED DESCRIPTION

To make the objectives, technical solutions, and advantages of the present invention clearer, the following further describes the present invention in detail with reference to the accompanying drawings. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
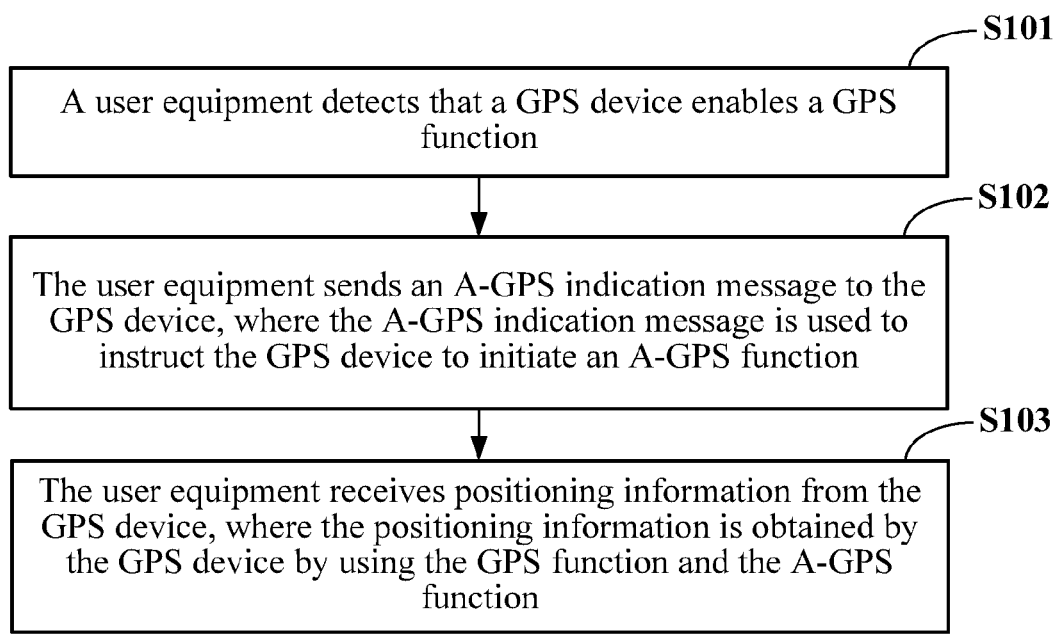
FIG. 1 is a schematic flowchart of an assisted positioning method according to Embodiment 1 of the present invention.

An assisted positioning method provided in Embodiment 1 of the present invention is described in detail below by using FIG. 1 as an example, and FIG. 1 is a schematic flowchart of the assisted positioning method according to Embodiment 1 of the present invention. The assisted positioning method is executed by a user equipment, the user equipment runs the WINDOWS 8 system, and the user equipment is connected to a GPS device having an A-GPS function.

As shown in FIG. 1, the assisted positioning method includes the following steps.

Step S101: The user equipment detects that the GPS device enables a GPS function.

The user equipment detects whether the GPS device enables the GPS function, and if the user equipment determines after detection that the GPS device enables the GPS function, the user equipment performs step S102.

Step S102: The user equipment sends an A-GPS indication message to the GPS device, where the A-GPS indication message is used to instruct the GPS device to enable an A-GPS function.

Because the GPS device has the A-GPS function, to obtain more accurate positioning information, after determining that the GPS device enables the GPS function, the user equipment sends the A-GPS indication message to the GPS device, to instruct the GPS device to enable the A-GPS function.

Optionally, after the user equipment sends the A-GPS indication message to the GPS device, the user equipment dials up according to a notification of the GPS device, to establish a network connection, where the network connection is used by the GPS device to implement the A-GPS function.

Step S103: The user equipment receives positioning information from the GPS device, where the positioning information is obtained by the GPS device by using the GPS function and the A-GPS function.

Optionally, the assisted positioning method may further include sending, by the user equipment, A-GPS configuration parameter information to the GPS device, where the A-GPS configuration parameter information is used by the GPS device to implement the A-GPS function.

The A-GPS configuration parameter information may include a current Internet Protocol (IP) address of the user equipment, information about a cell in which the user equipment is located, and information about a base station currently serving the user equipment.

According to the assisted positioning method provided in Embodiment 1 of the present invention, when a GPS device enables a GPS function, a user equipment running the WINDOWS 8 system actively sends an A-GPS indication message to the GPS device, so that the GPS device simultaneously uses the GPS function and an A-GPS function, thereby improving positioning accuracy.

Figure 2:
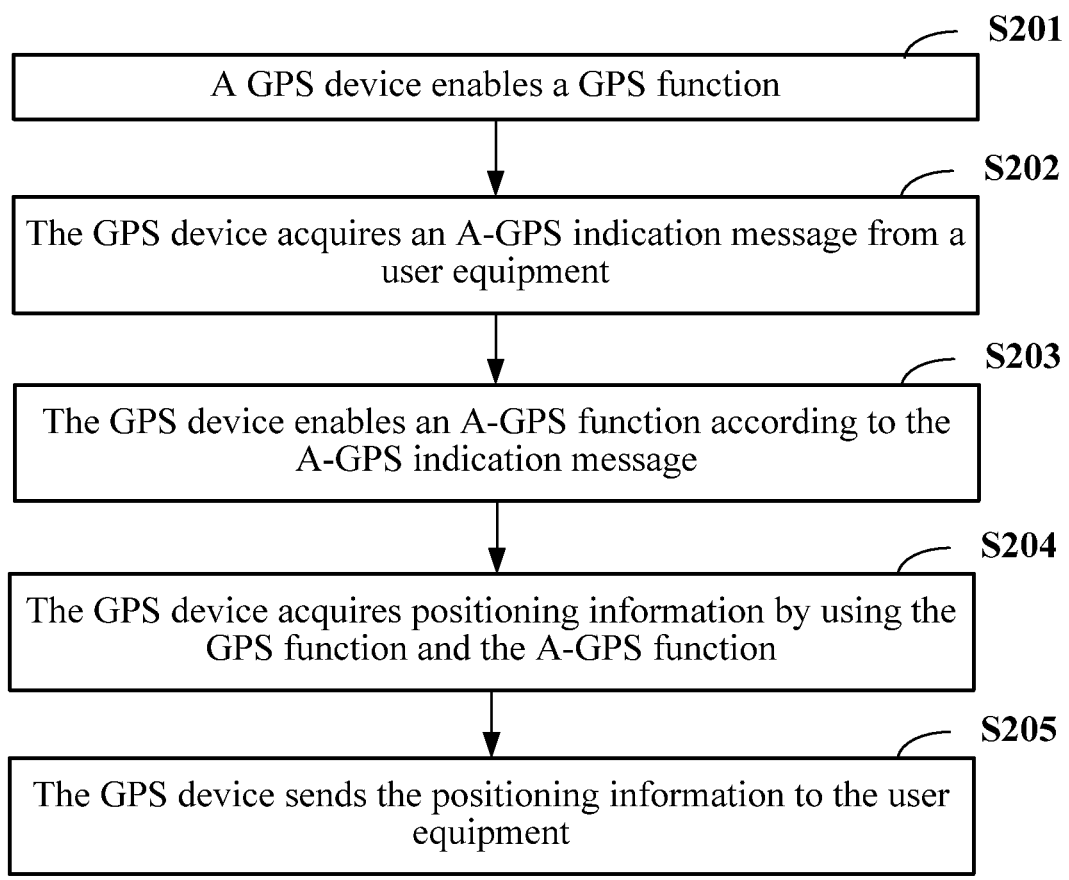
FIG. 2 is a schematic flowchart of an assisted positioning method according to Embodiment 2 of the present invention.

An assisted positioning method provided in Embodiment 2 of the present invention is described in detail below by using FIG. 2 as an example, and FIG. 2 is a schematic flowchart of the assisted positioning method according to Embodiment 2 of the present invention. The assisted positioning method is executed by a GPS device having an A-GPS function, and a user equipment running the WINDOWS 8 system is connected to the GPS device having the A-GPS function.

Step S201: The GPS device enables a GPS function.

Step S202: The GPS device acquires an A-GPS indication message from the user equipment.

After the GPS device enables the GPS function, the user equipment can find through detection that the GPS device has enabled the GPS function. Because the GPS device has the A-GPS function, to obtain more accurate positioning information, after determining that the GPS device enables the GPS function, the user equipment sends the A-GPS indication message to the GPS device, to instruct the GPS device to enable the A-GPS function.

Step S203: The GPS device enables the A-GPS function according to the A-GPS indication message.

Because the A-GPS function can be enabled only when a network connection is established, before the GPS device enables the A-GPS function, the method further includes determining, by the GPS device, a current network connection state, and if the GPS device is not connected to a network, dialing up, by the GPS device, to establish a network connection, where the network connection is used by the GPS device to implement the A-GPS function.

Alternatively, before the GPS device enables the A-GPS function, the method further includes determining, by the GPS device, a current network connection state, and if the GPS device is not connected to a network, instructing, by the GPS device, the user equipment to dial up, to establish a network connection, where the network connection is used by the GPS device to implement the A-GPS function.

Step S204: The GPS device acquires positioning information by using the GPS function and the A-GPS function.

Optionally, the assisted positioning method further includes receiving A-GPS configuration parameter information sent by the user equipment, where the A-GPS configuration parameter information is used by the GPS device to implement the A-GPS function.

The A-GPS configuration parameter information may include a current IP address of the user equipment, information about a cell in which the user equipment is located, and information about a base station currently serving the user equipment.

Step S205: The GPS device sends the positioning information to the user equipment.

After receiving the positioning information, the user equipment displays the positioning information in a user interface, to provide accurate positioning information to a user.

According to the assisted positioning method provided in Embodiment 2 of the present invention, when a GPS device enables a GPS function, by receiving an A-GPS indication message actively sent by a user equipment running the WINDOWS 8 system, the GPS device can simultaneously use the GPS function and an A-GPS function when enabling the GPS function, thereby improving positioning accuracy.

In a specific example, a user equipment runs the WINDOWS 8 system, and the user equipment is connected to a GPS device having an A-GPS function.

The user equipment detects whether the GPS device enables a GPS function; and if the user equipment determines after detection that the GPS device enables the GPS function, because the GPS device has the A-GPS function, to obtain more accurate positioning information, after determining that the GPS device enables the GPS function, the user equipment sends an A-GPS indication message to a GPS protocol stack of the GPS device, to instruct the GPS device to enable the A-GPS function.

After receiving the A-GPS indication message, the GPS protocol stack of the GPS device first detects a current connection state of the Packet Data Protocol (PDP). If no PDP connection is established currently, the GPS protocol stack of the GPS device dials up by using a connection manager in the GPS device, to establish a network connection, so that the A-GPS function is implemented.

After a PDP connection is established, the GPS protocol stack of the GPS device acquires assisted positioning information from a network side by using the connection manager in the GPS device, so that the GPS device acquires positioning information by using the GPS function and the A-GPS function. The assisted positioning information may include an IP address of the user equipment, information about a cell in which the user equipment is located, and information about a base station currently serving the user equipment.

A specific process during which the GPS device acquires the positioning information by using the GPS function and the A-GPS function is that, after acquiring the assisted positioning information from the network side by using the connection manager in the GPS device, the GPS protocol stack in the GPS device acquires satellite positioning information according to the assisted positioning information; and especially, when a satellite signal is weak or a satellite signal is blocked by an obstacle, the GPS protocol stack can acquire the satellite positioning information according to the assisted positioning information, thereby ensuring instantaneity and accuracy of the satellite positioning information. The satellite positioning information is the positioning information acquired by using the GPS function and the A-GPS function.

In another specific example, a user equipment runs the WINDOWS 8 system, the WINDOWS 8 system includes a mobile broad band interface model (MBIM) interface, and the user equipment is connected to a GPS device having an A-GPS function.

The user equipment detects whether the GPS device enables a GPS function; and if the user equipment determines after detection that the GPS device enables the GPS function, because the GPS device has the A-GPS function, to obtain more accurate positioning information, after determining that the GPS device enables the GPS function, the user equipment sends an A-GPS indication message to a GPS protocol stack of the GPS device, to instruct the GPS device to enable the A-GPS function.

After receiving the A-GPS indication message, the GPS protocol stack of the GPS device first detects a current connection state of the PDP. If the PDP is not connected currently, the GPS protocol stack of the GPS device notifies the user equipment; and after receiving a notification sent by the GPS protocol stack, the user equipment dials up through the MBIM interface, to establish a network connection, so that the GPS device implements the A-GPS function.

After a PDP connection is established, the user equipment acquires assisted positioning information from a network side, the assisted positioning information may include an IP address of the user equipment, information about a cell in which the user equipment is located, and information about a base station currently serving the user equipment. Then, the user equipment sends the assisted positioning information to the GPS device, so that the GPS device acquires positioning information by using the GPS function and the A-GPS function.

A specific process during which the GPS device acquires the positioning information by using the GPS function and the A-GPS function is that, after receiving the assisted positioning information sent by the user equipment, the GPS protocol stack of the GPS device acquires satellite positioning information according to the assisted positioning information; and especially, when a satellite signal is weak or a satellite signal is blocked by an obstacle, the GPS protocol stack can acquire the satellite positioning information according to the assisted positioning information, thereby ensuring instantaneity and accuracy of the satellite positioning information. The satellite positioning information is the positioning information acquired by using the GPS function and the A-GPS function.

Figure 3:
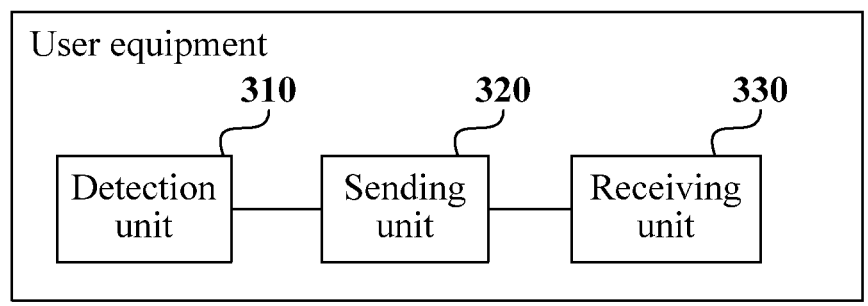
FIG. 3 is a schematic structural diagram of a user equipment according to Embodiment 3 of the present invention.

A user equipment provided in Embodiment 3 of the present invention is described in detail below by using FIG. 3 as an example, and FIG. 3 is a schematic structural diagram of the user equipment according to Embodiment 3 of the present invention. The user equipment runs the WINDOWS 8 system, and the user equipment is connected to a GPS device having an A-GPS function. The user equipment is configured to implement the assisted positioning method provided in Embodiment 1 of the present invention.

As shown in FIG. 3, the user equipment includes: a detection unit 310, a sending unit 320, and a receiving unit 330.

The detection unit 310 is configured to detect that the GPS device enables a GPS function.

The detection unit 310 detects whether the GPS device enables the GPS function, and if the detection unit 310 determines after detection that the GPS device enables the GPS function, the sending unit 320 sends an A-GPS indication message to the GPS device, where the A-GPS indication message is used to instruct the GPS device to enable the A-GPS function.

Because the GPS device has the A-GPS function, to obtain more accurate positioning information, after the detection unit 310 determines that the GPS device enables the GPS function, the sending unit 320 sends the A-GPS indication message to the GPS device, to instruct the GPS device to enable the A-GPS function.

Figure 4:
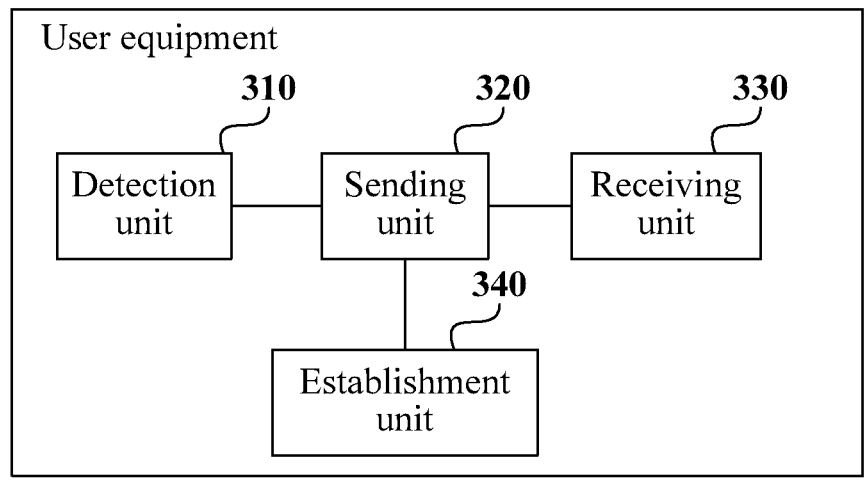
FIG. 4 is a schematic structural diagram of another user equipment according to Embodiment 3 of the present invention.

Optionally, as shown in FIG. 4, the user equipment further includes an establishment unit 340, and the establishment unit 340 is configured to, after the sending unit 320 sends the A-GPS indication message to the GPS device, dial up according to a notification of the GPS device, to establish a network connection, where the network connection is used by the GPS device to implement the A-GPS function.

The receiving unit 330 is configured to receive positioning information from the GPS device, where the positioning information is obtained by the GPS device by using the GPS function and the A-GPS function.

Optionally, the sending unit 320 is further configured to send A-GPS configuration parameter information to the GPS device, where the A-GPS configuration parameter information is used by the GPS device to implement the A-GPS function.

The A-GPS configuration parameter information may include a current IP address of the user equipment, information about a cell in which the user equipment is located, and information about a base station currently serving the user equipment.

According to the user equipment provided in Embodiment 3 of the present invention, when a GPS device enables a GPS function, the user equipment actively sends an A-GPS indication message to the GPS device, so that the GPS device simultaneously uses the GPS function and an A-GPS function, thereby improving positioning accuracy.

Figure 5:
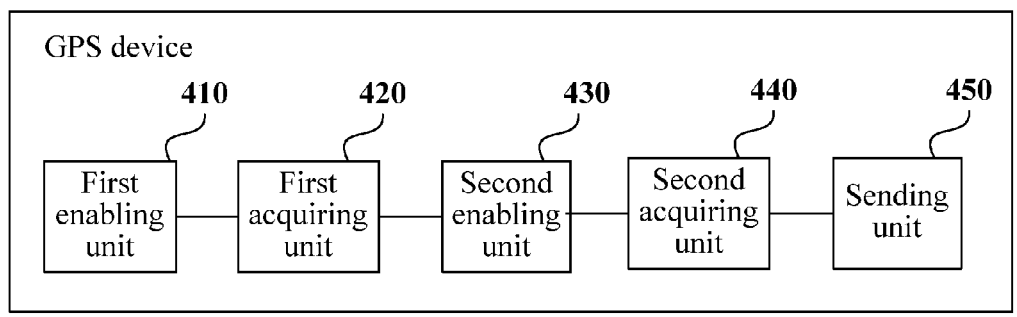
FIG. 5 is a schematic structural diagram of a GPS device according to Embodiment 4 of the present invention.

A GPS device provided in Embodiment 4 of the present invention is described in detail below by using FIG. 5 as an example, and FIG. 5 is a schematic structural diagram of the GPS device according to Embodiment 4 of the present invention. The GPS device has an A-GPS function, the GPS device is connected to a user equipment running the WINDOWS 8 system, and the GPS device is configured to implement the assisted positioning method provided in Embodiment 2 of the present invention.

As shown in FIG. 5, the GPS device includes a first enabling unit 410, a first acquiring unit 420, a second enabling unit 430, a second acquiring unit 440, and a sending unit 450.

The first enabling unit 410 is configured to enable a GPS function.

The first acquiring unit 420 is configured to acquire an A-GPS indication message from the user equipment.

After the first enabling unit 410 enables the GPS function, the user equipment may find through detection that the GPS device has enabled the GPS function. Because the GPS device has the A-GPS function, to obtain more accurate positioning information, after determining that the GPS device enables the GPS function, the user equipment sends the A-GPS indication message to the GPS device, to instruct the GPS device to enable the A-GPS function.

The second enabling unit 430 is configured to enable the A-GPS function according to the A-GPS indication message.

Figure 6:
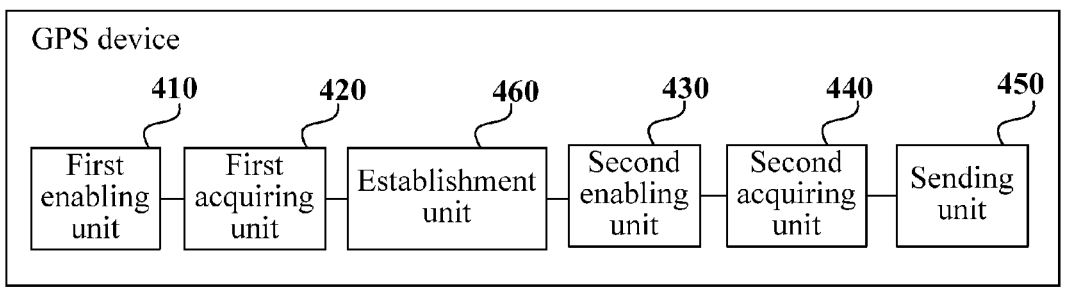
FIG. 6 is a schematic structural diagram of another GPS device according to Embodiment 4 of the present invention.

Because the A-GPS function can be enabled only when a network connection is established, as shown in FIG. 6, the GPS device further includes an establishment unit 460. The establishment unit 460 is configured to, before the GPS device enables the A-GPS function, determine a current network connection state, and if the GPS device is not connected to a network, dial up to establish a network connection, where the network connection is used by the GPS device to implement the A-GPS function.

Figure 7:
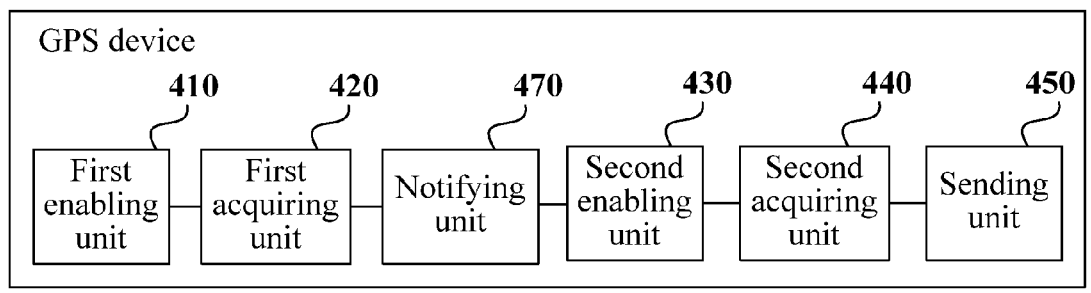
FIG. 7 is a schematic structural diagram of still another GPS device according to Embodiment 4 of the present invention.

Alternatively, as shown in FIG. 7, the GPS device further includes an instructing unit 470. The instructing unit 470 is configured to, before the GPS device enables the A-GPS function, determine, by the GPS device, a current network connection state, and if the GPS device is not connected to a network, instruct the user equipment to dial up, to establish a network connection, where the network connection is used by the GPS device to implement the A-GPS function.

The second acquiring unit 440 is configured to acquire positioning information by using the GPS function and the A-GPS function.

Figure 8:
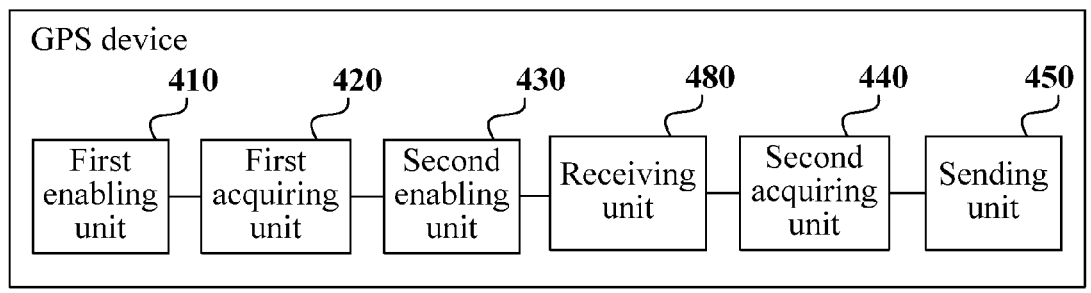
FIG. 8 is a schematic structural diagram of yet another GPS device according to Embodiment 4 of the present invention.

Optionally, as shown in FIG. 8, the GPS device further includes a receiving unit 480. The receiving unit 480 is configured to receive A-GPS configuration parameter information sent by the user equipment, where the A-GPS configuration parameter information is used by the GPS device to implement the A-GPS function.

The A-GPS configuration parameter information may include a current IP address of the user equipment, information about a cell in which the user equipment is located, and information about a base station currently serving the user equipment.

The sending unit 450 is configured to send the positioning information to the user equipment.

After receiving the positioning information, the user equipment displays the positioning information in a user interface, to provide accurate positioning information to a user.

According to the GPS device provided in Embodiment 4 of the present invention, when the GPS device enables a GPS function, by receiving an A-GPS indication message actively sent by a user equipment running the WINDOWS 8 system, the GPS device can simultaneously use the GPS function and an A-GPS function when enabling the GPS function, thereby improving positioning accuracy.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a compact disc ROM (CD-ROM), or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. An assisted positioning method, wherein a user equipment is connected to a global positioning system (GPS) device having an assisted global positioning system (A-GPS) function, and wherein the method comprises:
   detecting, by the user equipment, that the GPS device enables a GPS function;
   automatically sending, by the user equipment, an A-GPS indication message to the GPS device when the GPS device enables the GPS function such that the GPS device simultaneously enables both the GPS function and the A-GPS function, wherein the A-GPS indication message instructs the GPS device to enable the A-GPS function;
   sending, by the user equipment, A-GPS configuration parameter information to the GPS device, wherein the A-GPS configuration parameter information is used by the GPS device to implement the A-GPS function, and wherein the A-GPS configuration parameter information comprises information about a cell in which the user equipment is located; and
   receiving, by the user equipment, positioning information from the GPS device,
   wherein the single GPS device simultaneously provides the positioning information obtained using the GPS function and the A-GPS function,
   wherein the GPS function provides satellite positioning information, and
   wherein the A-GPS function provides information about a base station currently serving the user equipment.

2. The method according to claim 1, wherein the method farther comprises dialing up, by the user equipment, according to a notification of the GPS device, to establish a network connection after sending, by the user equipment, the A-GPS indication message to the GPS device, wherein the network connection is used by the GPS device to implement the A-GPS function.

3. The method according to claim 1, wherein the user equipment acquires the satellite positioning information by a GPS protocol stack according to the A-GPS function when a satellite signal is weak to ensure accuracy of the satellite positioning information.

4. The method according to claim 1, wherein the user equipment and the GPS device are integrated into a single mobile device, and wherein the single mobile device comprises a WINDOWS operating system.

5. An assisted positioning method, wherein a global positioning system (GPS) device has an assisted global positioning system (A-GPS) function, wherein the GPS device is connected to a user equipment, and wherein the method comprises:
   enabling, by the GPS device, a GPS function;
   acquiring, by the GPS device, an A-GPS indication message from the user equipment;
   acquiring, by the GPS device, A-GPS configuration parameter information from the user equipment, wherein the A-GPS configuration parameter information is used by the GPS device to implement the A-GPS function, and wherein the A-GPS configuration parameter information comprises information about a cell in which the user equipment is located;
   automatically enabling, by the GPS device, the A-GPS function according to the A-GPS indication message when the GPS device enables the GPS function such that the GPS device simultaneously enables both the GPS function and the A-GPS function;
   simultaneously acquiring, by the single GPS device, positioning information obtained using the GPS function and the A-GPS function, wherein the GPS function provides satellite positioning information, and wherein the A-GPS function provides information about a base station currently serving the user equipment; and
   sending, by the GPS device, the positioning information to the user equipment.

6. The method according to claim 5, wherein before enabling, by the GPS device, the A-GPS function, the method further comprises:
   determining, by the GPS device, a current network connection state; and
   dialing up, by the GPS device, to establish a network connection when the GPS device is not connected to a network, wherein the network connection is used by the GPS device to implement the A-GPS function.

7. The method according to claim 5, wherein before enabling, by the GPS device, the A-GPS function, the method further comprises:
   determining, by the GPS device, a current network connection state; and
   instructing, by the GPS device, the user equipment to dial up, to establish a network connection when the GPS device is not connected to a network, wherein the network connection is used by the GPS device to implement the A-GPS function.

8. The method according to claim 5, wherein the user equipment acquires the satellite positioning information by a GPS protocol stack according to the A-GPS function when a satellite signal is weak to ensure accuracy of the satellite positioning information.

9. The method according to claim 5, wherein the user equipment and the GPS device are integrated into a single mobile device, and wherein the single mobile device comprises a WINDOWS operating system.

10. A user equipment, wherein the user equipment is connected to a global positioning system (GPS) device having an assisted global positioning system (A-GPS) function, and wherein the user equipment comprises:
a non-transitory computer readable medium having instructions stored thereon; and
a computer processor coupled to the non-transitory computer readable medium and configured to execute the instructions to:
detect that the GPS device enables a GPS function;
automatically send an A-GPS indication message to the GPS device when the GPS device enables the GPS function such that the GPS device simultaneously enables both the GPS function and the A-GPS function, wherein the A-GPS indication message instructs the GPS device to enable the A-GPS function;
send A-GPS configuration parameter information to the GPS device, wherein the A-GPS configuration parameter information is used by the GPS device to implement the A-GPS function, and wherein the A-GPS configuration parameter information comprises information about a cell in which the user equipment is located; and
receive positioning information from the GPS device,
wherein the single GPS device simultaneously provides the positioning information obtained using the GPS function and the A-GPS function,
wherein the GPS function provides satellite positioning information, and
wherein the A-GPS function provides information about a base station currently serving the user equipment.

11. The user equipment according to claim 10, wherein the computer processor is further configured to execute the instructions to dial up according to a notification of the GPS device, to establish a network connection after the user equipment sends the A-GPS indication message to the GPS device, wherein the network connection is used by the GPS device to implement the A-GPS function.

12. The user equipment according to claim 10, wherein the user equipment acquires the satellite positioning information by a GPS protocol stack according to the A-GPS function when a satellite signal is weak to ensure accuracy of the satellite positioning information.

13. The user equipment according to claim 10, wherein the user equipment and the GPS device are integrated into a single mobile device, and wherein the single mobile device comprises a WINDOWS operating system.

14. A global positioning system (GPS) device, wherein the GPS device has an assisted global positioning system (A-GPS) function, wherein the GPS device is connected to a user equipment, and wherein the GPS device comprises:
a non-transitory computer readable medium having instructions stored thereon; and
a computer processor coupled to the non-transitory computer readable medium and configured to execute the instructions to:
enable a GPS function;
acquire an A-GPS indication message from the user equipment;
receive A-GPS configuration parameter information sent by the user equipment, wherein the A-GPS configuration parameter information is used by the GPS device to implement the A-GPS function, and wherein the A-GPS configuration parameter information comprises information about a cell in which the user equipment is located;
automatically enable the A-GPS function according to the A-GPS indication message when the GPS device enables the GPS function such that the GPS device simultaneously enables both the GPS function and the A-GPS function;
simultaneously acquire, by the single GPS device, positioning information using the GPS function and the A-GPS function, wherein the GPS function provides satellite positioning information, and wherein the A-GPS function provides information about a base station currently serving the user equipment; and
send the positioning information to the user equipment.

15. The GPS device according to claim 14, wherein the computer processor is further configured to execute the instructions to:
determine a current network connection state before the A-GPS function is enabled; and
dial up to establish a network connection when the GPS device is not connected to a network, wherein the network connection is used by the GPS device to implement the A-GPS function.

16. The GPS device according to claim 14, wherein the computer processor is further configured to execute the instructions to:
determine a current network connection state before the GPS device enables the A-GPS function; and
instruct the user equipment to dial up, to establish a network connection when the GPS device is not connected to a network, wherein the network connection is used by the GPS device to implement the A-GPS function.

17. The GPS device according to claim 14, wherein the user equipment acquires the satellite positioning information by a GPS protocol stack according to the A-GPS function when a satellite signal is weak to ensure accuracy of the satellite positioning information.

18. The GPS device according to claim 14, wherein the user equipment and the GPS device are integrated into a single mobile device, and wherein the single mobile device comprises a WINDOWS operating system.

* * * * *